(12) United States Patent  (10) Patent No.: US 7,296,674 B2
Lawless et al.  (45) Date of Patent: Nov. 20, 2007

(54) CONVEYOR SYSTEM LOAD TRANSFER METHODS AND APPARATUS

(75) Inventors: Robert Joseph Lawless, Acworth, GA (US); Rumen V. Stoyanov, Acworth, GA (US)

(73) Assignee: Jolex Enterprises, Inc., Kennesaw, GA (US)

( * ) Notice: Subject to any disclaimer, the term of this patent is extended or adjusted under 35 U.S.C. 154(b) by 184 days.

(21) Appl. No.: 11/004,357

(22) Filed: Dec. 3, 2004

(65) Prior Publication Data

US 2005/0225028 A1    Oct. 13, 2005

Related U.S. Application Data

(63) Continuation-in-part of application No. 10/631,945, filed on Jul. 31, 2003, now Pat. No. 6,866,139.

(60) Provisional application No. 60/400,632, filed on Aug. 1, 2002.

(51) Int. Cl.
    *B65G 13/02* (2006.01)

(52) U.S. Cl. .............. 198/782; 198/463.4; 198/463.5; 193/35 A; 193/35 SS; 193/35 G

(58) Field of Classification Search ............ 198/463.4, 198/463.5, 782; 193/35 SS, 35 A, 35 G, 193/DIG. 2
    See application file for complete search history.

(56) References Cited

U.S. PATENT DOCUMENTS

| | | | |
|---|---|---|---|
| 1,761,199 A * | 6/1930 | Drake | 198/782 |
| 2,848,845 A * | 8/1958 | Doumont | 198/784 |
| 3,690,440 A | 9/1972 | Macpherson | |
| 3,901,378 A | 8/1975 | Rolland | |
| 4,042,101 A | 8/1977 | Krammer et al. | |
| 4,068,751 A * | 1/1978 | Azzi | 193/36 |
| 4,143,755 A | 3/1979 | Keller | |
| 4,219,114 A * | 8/1980 | Kovacs | 198/780 |
| 4,219,115 A | 8/1980 | Moore | |
| 4,696,386 A | 9/1987 | Lem | |
| 4,714,152 A * | 12/1987 | Ross | 198/347.3 |
| 4,860,973 A | 8/1989 | Fenner | |
| 5,207,313 A | 5/1993 | Gebhardt | |
| 5,213,189 A * | 5/1993 | Agnoff | 193/35 A |
| 6,176,283 B1 | 1/2001 | Knerr | |
| 6,202,821 B1 * | 3/2001 | Crockett | 193/35 G |
| 6,328,154 B1 | 12/2001 | Huber | |
| 6,439,369 B1 * | 8/2002 | Brown | 198/459.6 |
| 6,575,286 B1 * | 6/2003 | Mills | 193/35 A |
| 6,640,953 B2 * | 11/2003 | Brouwer et al. | 193/35 A |
| 6,672,450 B2 | 1/2004 | Horne | |
| 6,719,125 B1 * | 4/2004 | Hollander | 198/781.03 |
| 6,763,930 B2 * | 7/2004 | Johnson et al. | 198/459.6 |
| 7,007,790 B2 * | 3/2006 | Brannon | 198/346 |
| 2005/0072657 A1 | 4/2005 | Lawless | |

FOREIGN PATENT DOCUMENTS

CH    629 443 A5    4/1982
DE    43 09 222 A1  9/1993

* cited by examiner

*Primary Examiner*—Douglas Hess
(74) *Attorney, Agent, or Firm*—Sutherland, Asbill & Brennan

(57) ABSTRACT

Conveyor systems for storage and movement of goods on pallets and slip sheets. The transfer structures enable slip sheet mounted loads to be transferred to a roller conveyor by providing structures that cooperate with wide platen forks of a lift truck. The structures provide roller contact between a portion of the underside of the slip sheet at all times. In other areas there is alternatively contact between a lift truck platen or additional rollers that cooperate in a manner making it possible to move the slip sheet mounted load from the lift truck to an adjacent conveyor system.

20 Claims, 20 Drawing Sheets

SECTION A-A

SECTION B-B

SECTION C-C

CONVEYOR SYSTEM LOAD TRANSFER METHODS AND APPARATUS

RELATED APPLICATIONS

This application is a continuation-in-part application of U.S. application Ser. No. 10/631,945, entitled "Conveyor System Load Transfer Devices," filed on Jul. 31, 2003, now U.S. Pat. No. 6,866,139 which claims the benefit of U.S. Provisional Application No. 60/400,632 entitled "Conveyor System Load Transfer Devices" filed on Aug. 1, 2002, all of which are incorporated herein by reference.

FIELD OF THE INVENTION

This invention relates to conveyor systems for storage and movement of goods on pallets and slip sheets and, in particular, to the use of slip sheets with roller conveyor systems.

BACKGROUND OF THE INVENTION

Goods are stored and shipped throughout the world in relatively uniform size loads that rest on either pallets or thin plates of pasteboard or other durable material known as slip sheets. Slip sheets provide cost, weight, size and other advantages as compared to pallets but are not as stiff as pallets and must therefore be supported with contact over a larger portion of their undersides than pallets. Accordingly, while pallets can be lifted and transported by contact between relatively narrow regions of the pallet understructure and forks, such as conventional lift truck forks, much wider structures must be used to support slip sheets bearing loads. Transfer of loads resting on slip sheets therefore conventionally occurs by sliding the slip sheet and load between two locations by either pushing the slip sheet and load or pulling the slip sheet by grasping an edge of the slip sheet. There are numerous drawbacks associated with these activities.

As a result, it is desirable to provide improved structures and means for transferring loads carried on slip sheets on to and off of roller conveyor systems.

Furthermore, it is desirable to provide methods and apparatus for providing safety features for operating the roller conveyor systems.

SUMMARY OF THE INVENTION

The transfer structures of this invention enable slip sheet mounted loads to be transferred, for instance, from a lift truck to a roller conveyor by providing structures that cooperate with wide platen forks of a lift truck. The structures provide roller contact with at least a portion of the underside of the slip sheet at all times. In other areas there is alternatively contact between a lift truck platen or additional rollers that cooperate in a manner making it possible to move the slip sheet mounted load from the lift truck to an adjacent conveyor system.

According to one aspect of this invention, a conveyor transfer structure for use with loads supported on a slip sheet includes fixed position rollers, movable position rollers, and a stop. The fixed position rollers provide contact with a slip sheet. The movable position rollers are movable between a first position supporting a portion of the slip sheet and a second position permitting lift platen contact with a portion of the slip sheet. The stop is movable between an elevated position and a depressed position. The elevated position permits slip sheet contact with the stop, and the depressed position permits lift platen contact with a portion of the movable position rollers.

According to another aspect of this invention, a safety apparatus for use with a conveyor transfer structure comprising movable position rollers is provided. The apparatus includes a stop movable between an upper position and a lower position, wherein the lower position permits lift platen contact with the movable position rollers; and an indicator operably connected to the stop providing an indication of a position of the stop.

According to another aspect of this invention, a method of using a transfer conveyor structure is provided. The method includes lifting a slip sheet mounted load with a lift platen; contacting a stop associated with the transfer conveyor structure with a portion of the platen, wherein the stop pivots to a lower position; receiving an indication of the lower position of the stop; contacting the platen with a portion of the movable position rollers associated with the transfer conveyor structure, wherein the movable position rollers pivot downward; lowering the slip sheet mounted load onto a portion of the fixed position rollers; and removing the platen from contact with the slip sheet mounted load, wherein a portion of the movable position rollers pivot upward to contact a portion of the slip sheet mounted load, and the stop pivots to an upper position.

According to yet another aspect of this invention, a method of using a safety apparatus with a conveyor transfer structure for supporting a slip sheet mounted load is provided. The method includes depressing a stop associated with the conveyor transfer structure from an upper position to a lower position; and observing an indication from the safety apparatus that the stop is in the lower position.

Objects, features, and advantages of various embodiments of the invention include:

(1) Improved structures and means for transferring loads carried on slip sheets on to and off of roller conveyor; and
(2) Methods and apparatus for providing safety features for operating roller conveyor systems.

Other objects, features and advantages of various embodiments according to the invention are apparent from the other parts of this document.

DESCRIPTION OF THE INVENTION

The present invention relates to transfer structures enabling slip sheet mounted loads to be transferred, for instance, from a lift truck to a roller conveyor by providing structures that cooperate with wide platen forks of a lift truck. The structures provide roller contact between at least a portion of the underside of the slip sheet at all times. In other areas there is alternatively contact between a lift truck platen or additional rollers that cooperate in a manner making it possible to move the slip sheet mounted load from the lift truck to an adjacent conveyor system. Furthermore, the present invention relates to an apparatus providing safety features for operating roller conveyor systems. Methods of using the transfer structures and apparatus are also described.

FIRST EMBODIMENT

Figure 1:
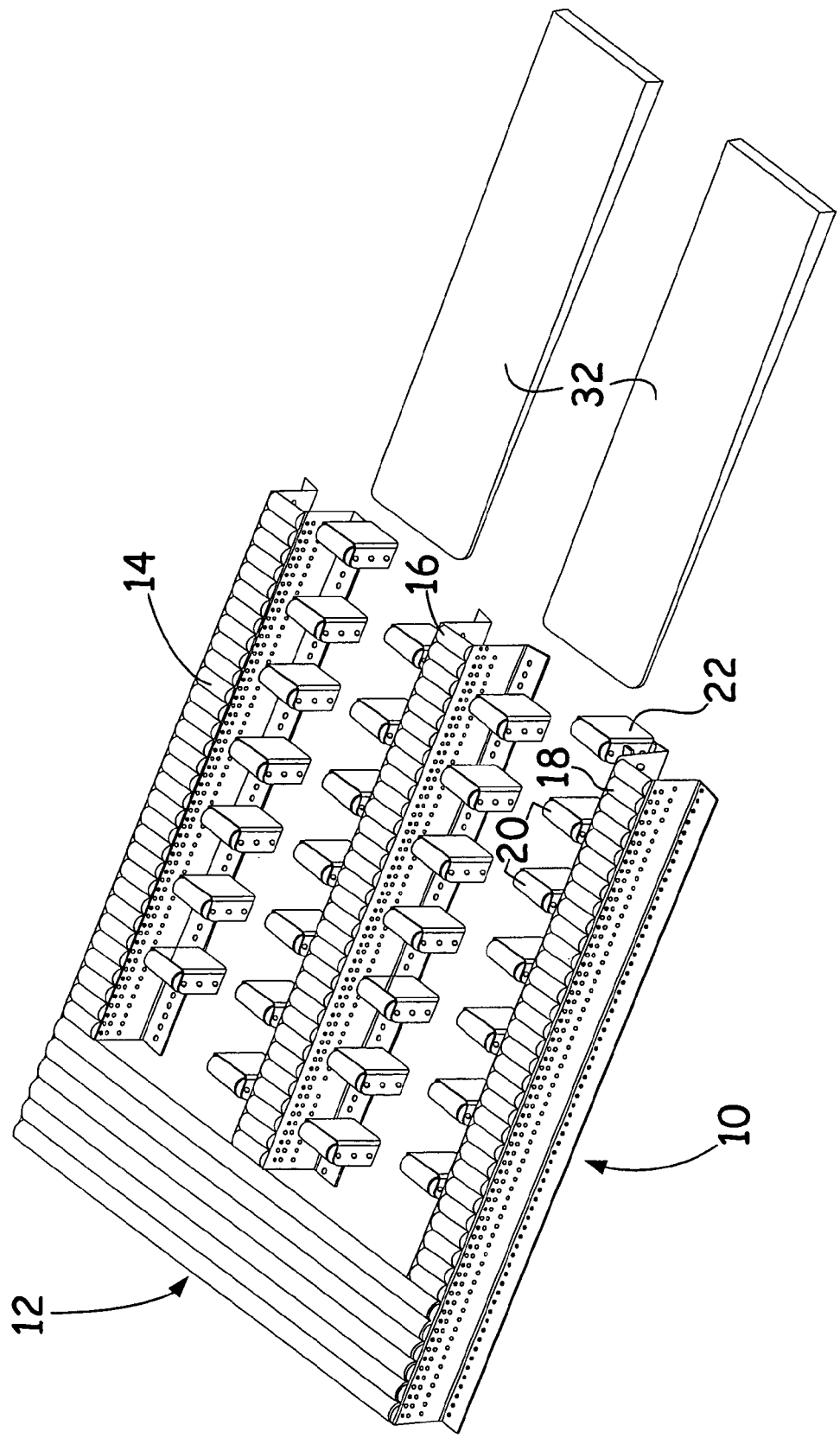
FIGS. 1, 2 and 3 illustrate a first embodiment of the transfer mechanism of this invention using pivoting rollers that pivot out of the way to make room for lift truck platens or forks.
Figure 2:
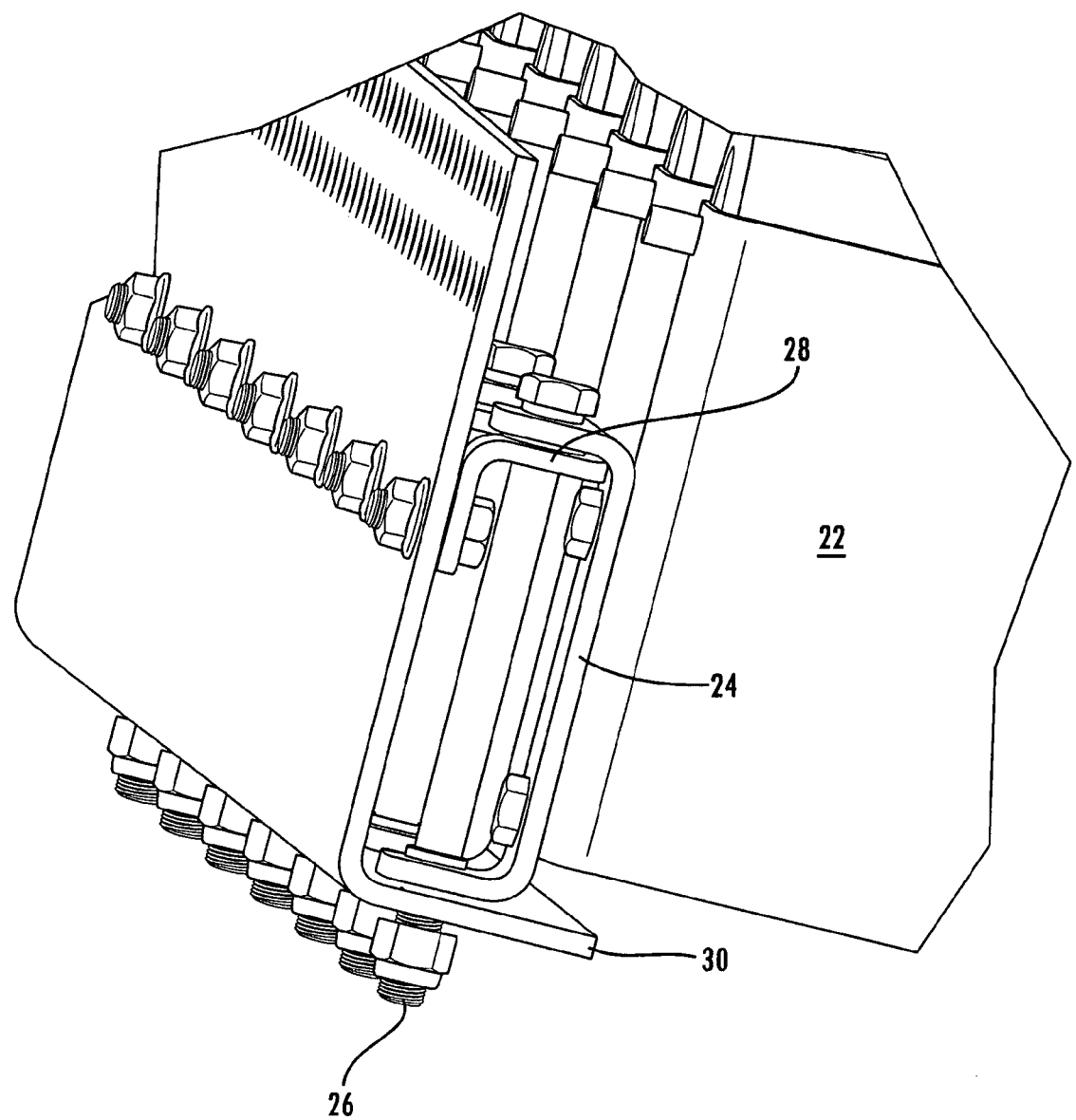
Figure 3:
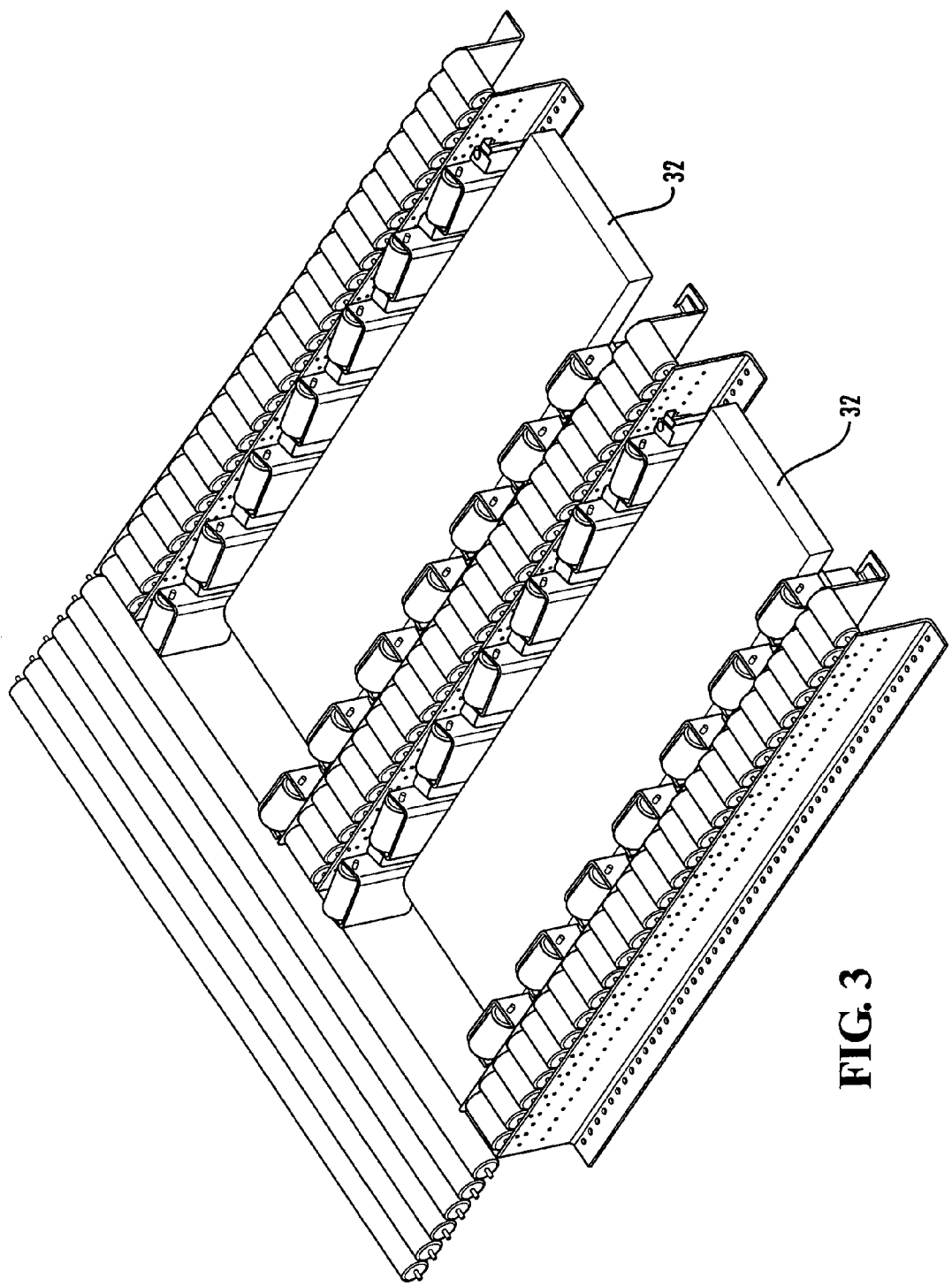

In the first embodiment of the transfer structure of this invention, illustrated in FIGS. 1, 2, and 3, the transfer structure comprises a generally rectangular structure approximating the size of a conventional slip sheet. The transfer structure, as may be seen in FIG. 1, includes: (1) fixed rollers positioned in the same plane as adjacent roller conveyor structure and (2) movable rollers that move, in response to the presence of lift truck platen, from a first position with the rollers in the same plane as the fixed rollers, to a second position that may or may not place the movable rollers in the same plane but that provides room for the lift truck platens.

FIGS. 1, 2, and 3 illustrate a first embodiment of this invention where the transfer structure 10 is mounted adjacent to conventional roller conveyor structure 12. As shown in FIG. 1, fixed rollers 14 and 18 are located at the side edges and middle of transfer structure 10. The tops of roller 14, 16, and 18 are in the same plane as, and their rotational axes are parallel with, rollers 12 of the conventional conveyor structure. Pivotable rollers 20 are located on either side of rollers 16 and on the inner sides of rollers 14 and 18. Each pivotable roller 20 is mounted on a housing 22. As may be seen by reference to the fragmentary details shown in FIG. 2, the housing 22 is attached to a bracket 24 that pivots on a hinge bolt 26 that also passes through a mounting bracket 28 that is fastened to a roller support channel 30.

Operation of the transfer structure embodiment shown in FIGS. 1, 2, and 3 can be appreciated by comparison of FIGS. 1 and 3. A load mounted on a slip sheet resting on platens 32 is moved onto transfer structure 10 by advancement of platens 32 from the position shown in FIG. 1 outside of the transfer structure 10 to the position shown in FIG. 3 where platens 32 are positioned between the central fixed roller 16 and one or the other of rollers 14 and 18. As platens 32 move into that position, their ends contact the housings 22 of pivotable rollers 20 and cause the housings to pivot from the positions shown in FIG. 1 with the rollers 20 parallel to rollers 12 to the positions shown in FIG. 3, in which rollers 20 are generally perpendicular to rollers 12. After platens 32 and the load and slip sheet (not shown) move into the transfer structure as shown in FIG. 3, platens 32 are lowered until the slip sheet rests solely on rollers 14, 16, 18, and 20, and platens 32 are withdrawn, allowing pivotable rollers 20 to pivot (under force from springs or other suitable structures not shown) to the position shown in FIG. 1 in which the rotational axes of all rollers are parallel.

After the slip sheet and load are thus resting solely on the rollers of transfer structure 10, the load can be pushed in the direction of conveyor rollers 12 and can move along the conveyor system in the conventional manner.

As will be appreciated by one skilled in the conveyor art, the transfer structures of this invention can also be used for removal of a load resting on a slip sheet by movement of the load onto the transfer structure and use of the lift truck platens in steps that are reverse in order from the above description.

SECOND EMBODIMENT

Figure 4:
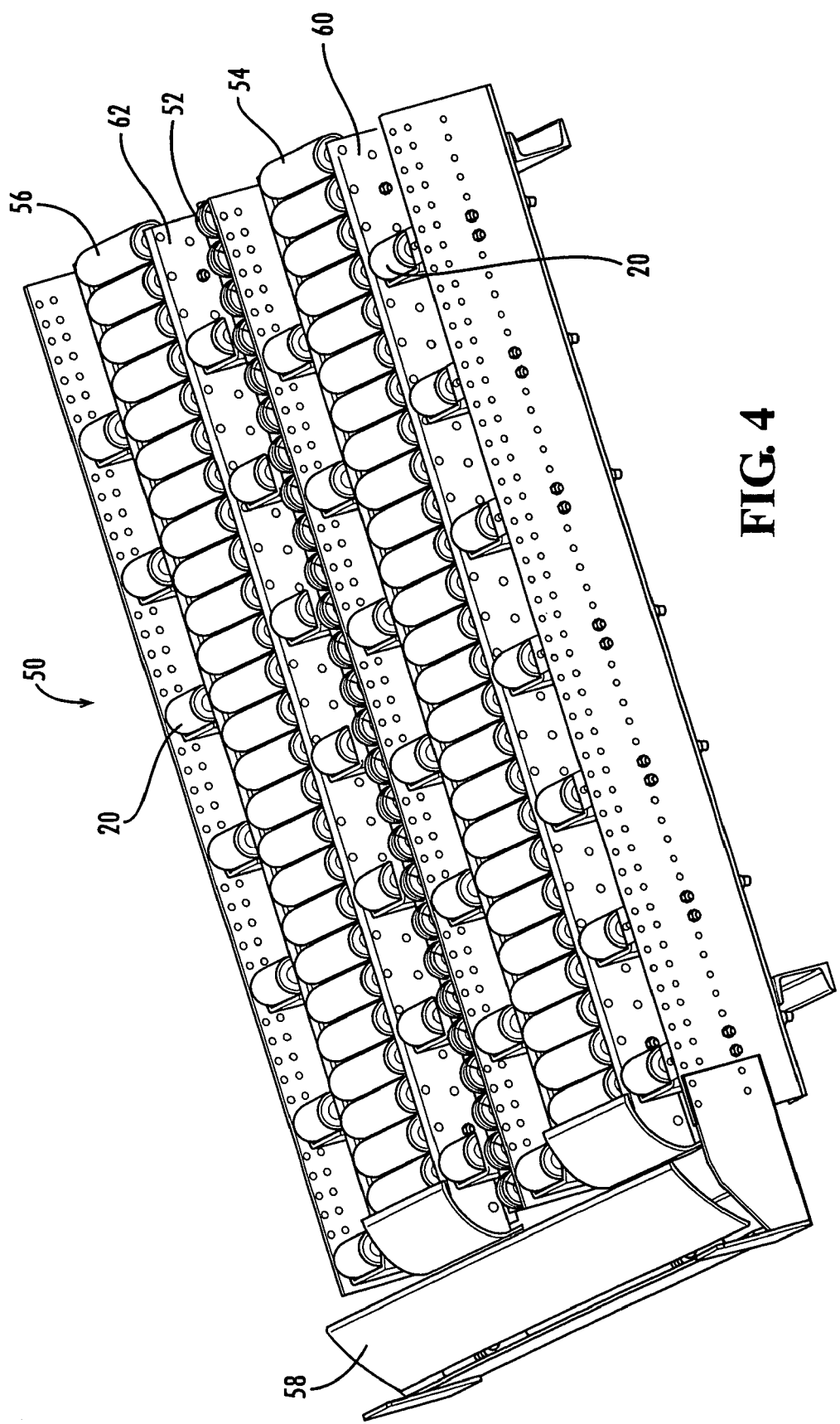
FIGS. 4, 5 and 6 illustrate a second embodiment of the transfer mechanism of this invention using pivoting rollers and racks of rollers that pivot down and back to make room for lift truck platens or forks.
Figure 5:
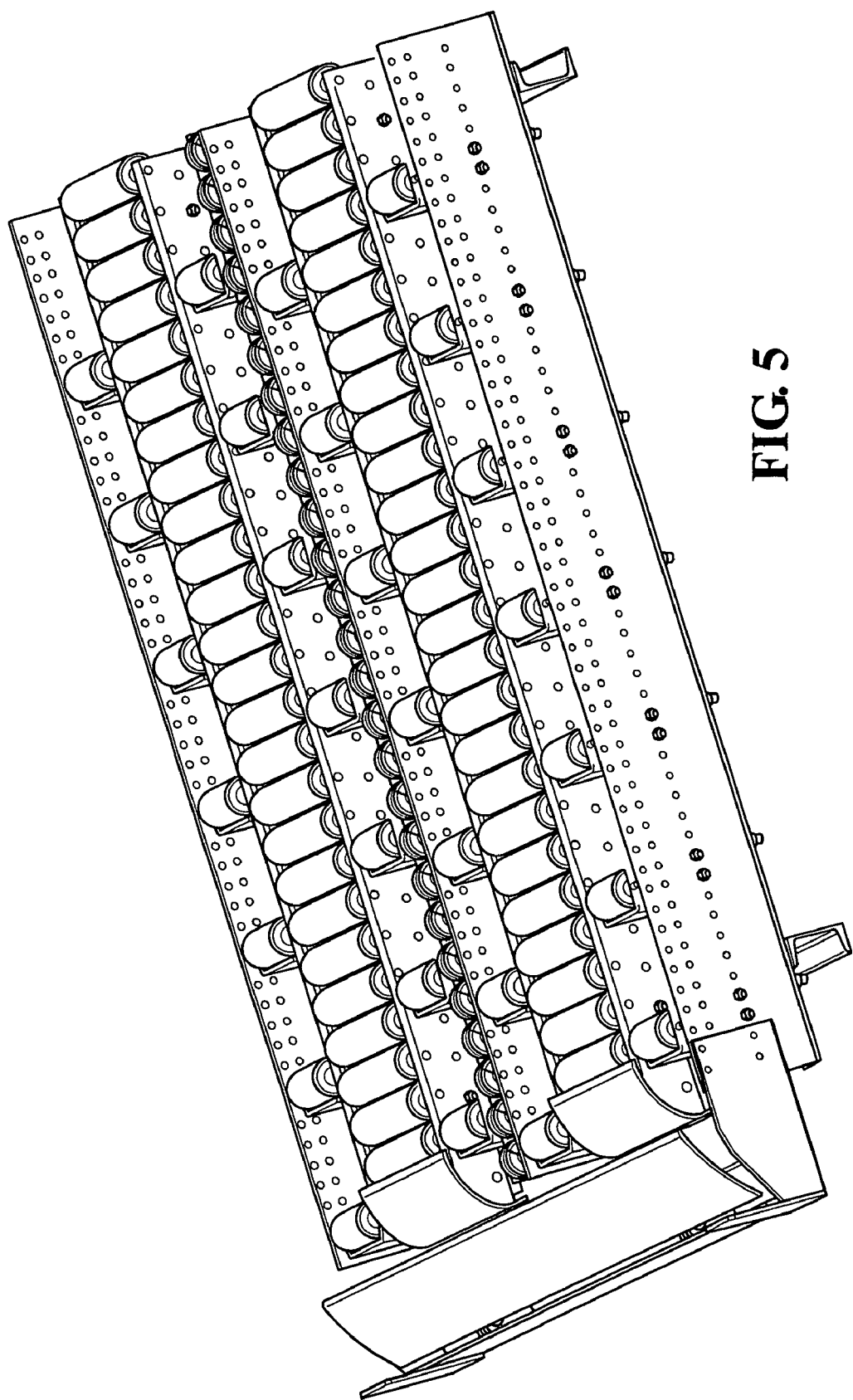
Figure 6:
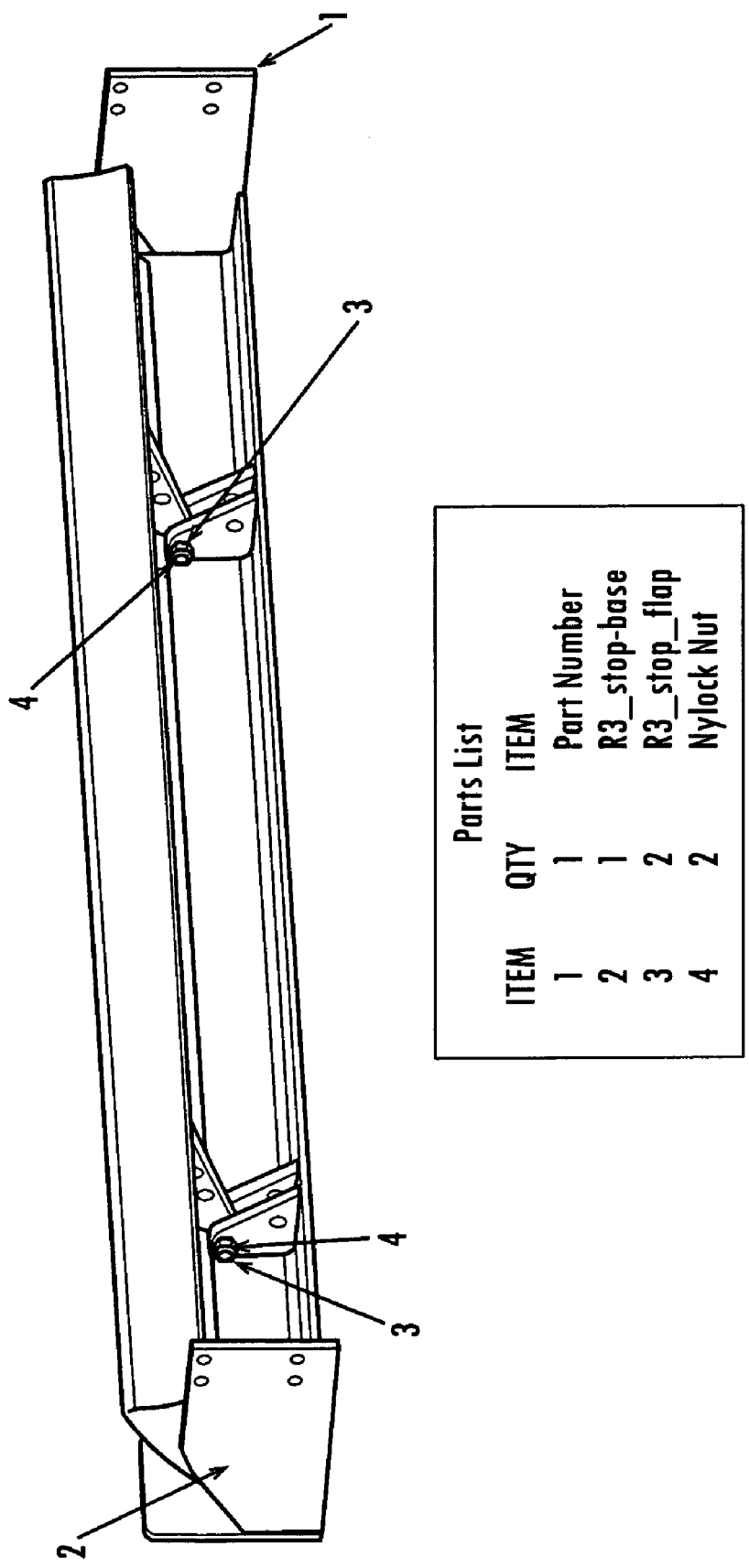

FIGS. 4, 5, and 6 illustrate another embodiment of the transfer structure of this invention. In this embodiment 50, hinged rollers 20 (structured in the same manner as hinged rollers 20 in embodiment 10 described above) are utilized. Fixed wheels 52 are located as illustrated in the center of embodiment 50 and, optionally, other fixed wheels or rollers (not shown) may be used, depending on the nature of the loads to be handled and their dimensions.

Embodiment 50 also utilizes two sections of rollers 54 and 56 mounted in a manner so that they are biased by a spring, pneumatic cylinder, or other suitable structure normally to be in the position shown in FIG. 4. However, sections of rollers 54 and 56 may be caused to pivot downwards by platens 32 (not shown in FIGS. 4, 5 and 6) so that platens 32 may lie on top of the sections of rollers 54 and 56.

In operation of this embodiment 50, the ends of platens 32 contact stop 58 as the platens move to the right in FIG. 4. Stop 58 is coupled to support structure 60 and 62 for rollers 54 and 56, respectively, causing support structures 60 and 62 to pivot to the right and downward in FIG. 4 to positions out of the way of platens 32, so that a load resting on a slip sheet in turn resting on platens 32 may be placed on or moved from transfer structure 50.

As described above relative to the first embodiment (10) of this invention, the pivotable rollers 20 pivot. When the load is lifted off of transfer structure 50 or platens 32 are moved out from under the load and slip sheet, the pivotable rollers 20 pivot forward to the position shown in FIG. 4, and the sections of rollers 54 and 56 move back and up to the position shown in FIG. 4, providing additional support for the slip sheet that remains on the transfer structure 50 or that is moved from the conveyor rollers 12 onto transfer structure 50.

THIRD EMBODIMENT

Figure 7:
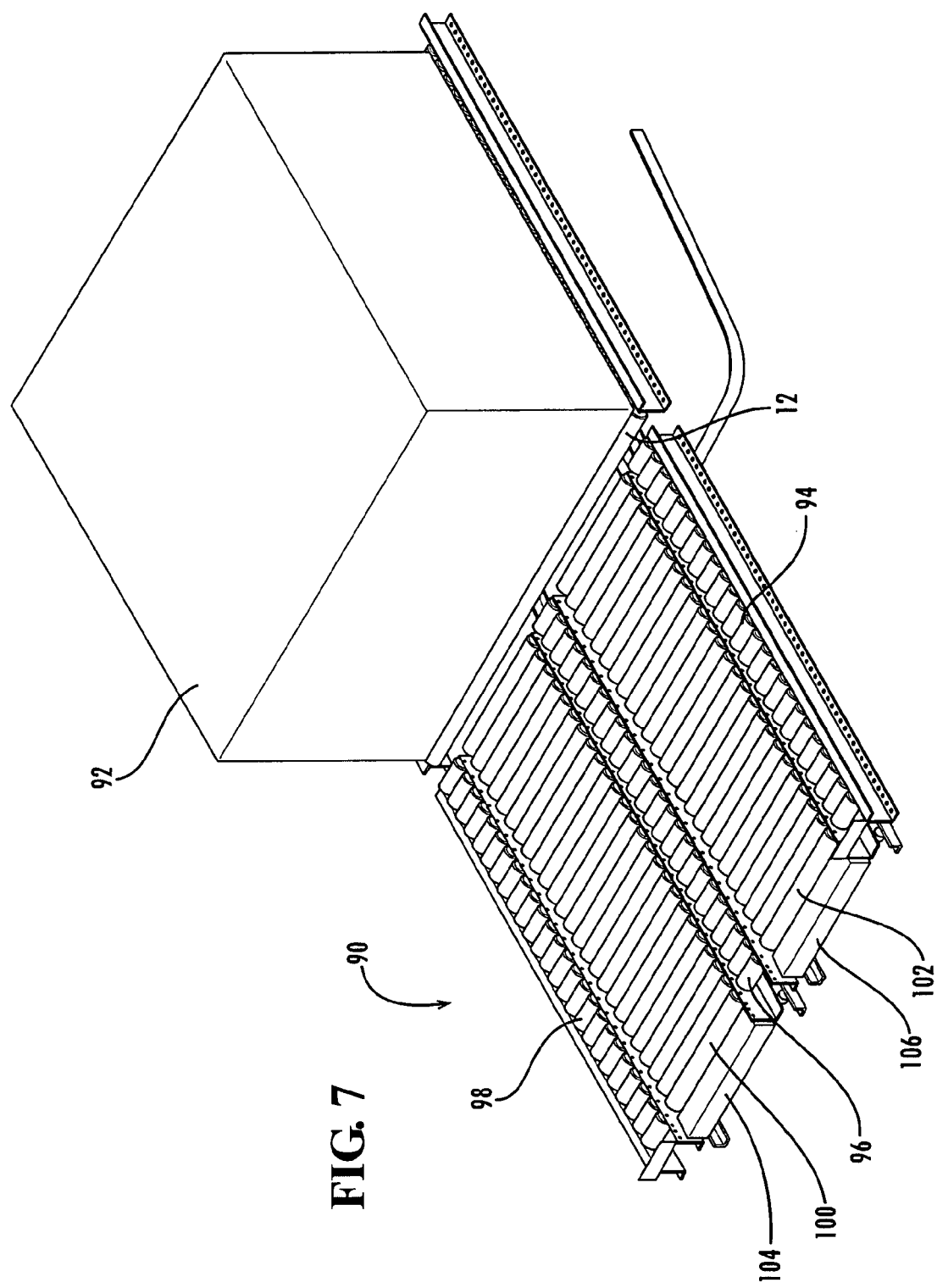
FIGS. 7, 8 and 9 illustrate a third embodiment of the transfer mechanism of this invention using racks of rollers that move down and back on tracks to make room for lift truck platens or forks.
Figure 8:
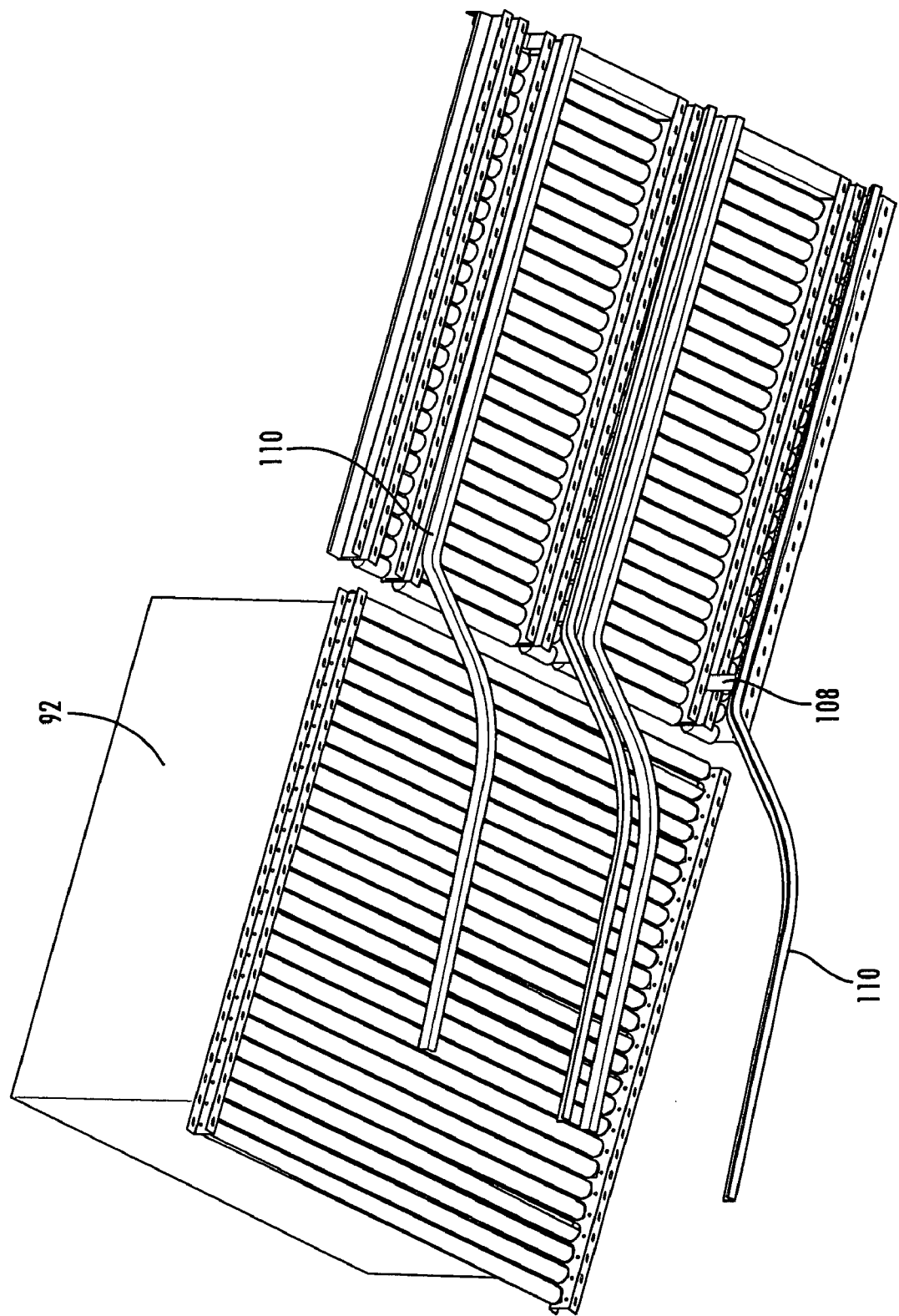
Figure 9:
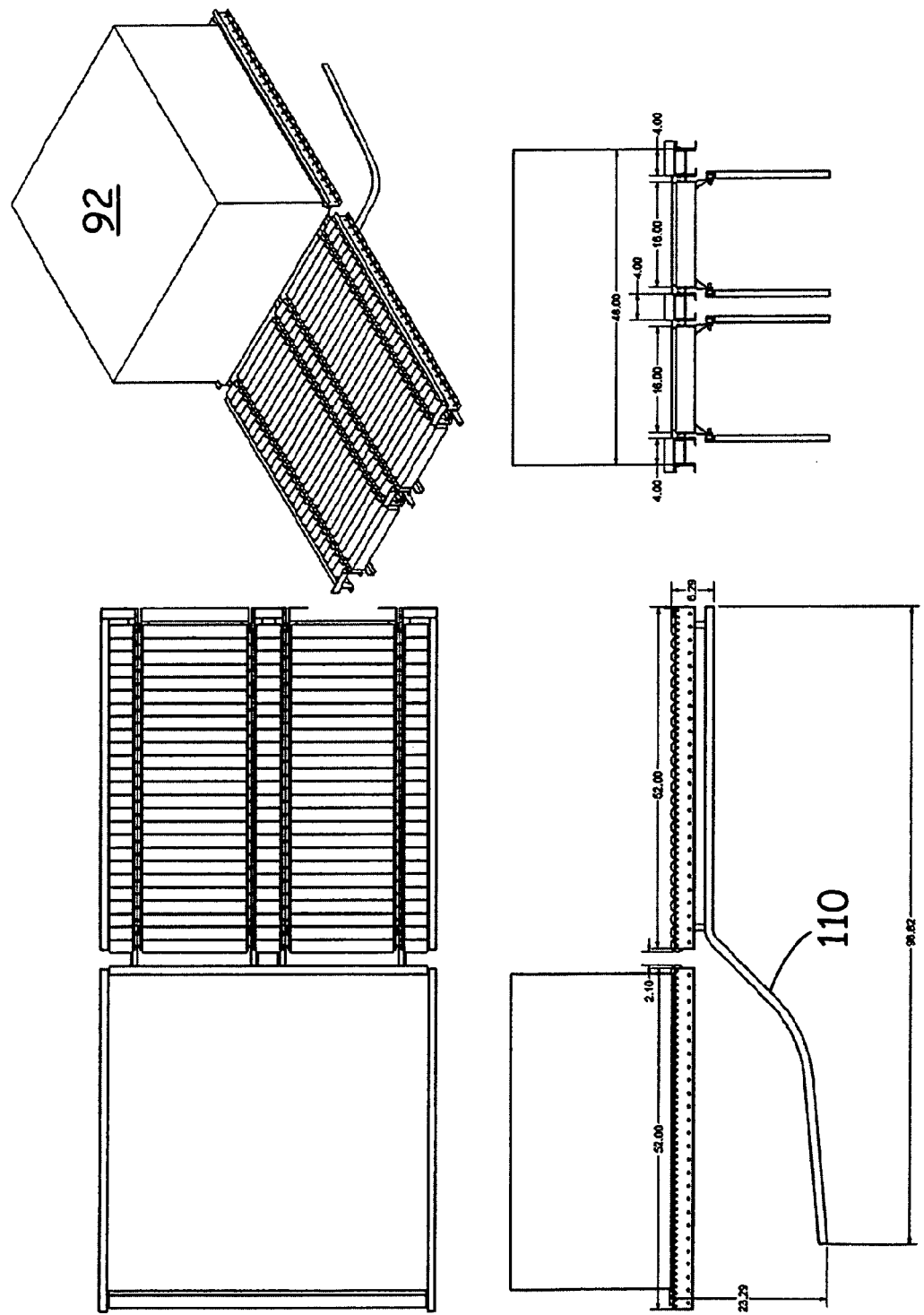

FIGS. 7, 8, and 9 illustrate a third embodiment 90 of the transfer structure of this invention together with a load mounted on a slip sheet schematically illustrated as a load 92. Transfer structure 90 utilizes relatively short fixed rollers 94, 96, and 98, mounted parallel to rollers 12 of a conventional conveyor structure. Sliding rollers 100 and 102 also mounted parallel to conventional rollers 12 are fixed in rack frames 104 and 106. Each of frames 104 and 106 is mounted, as may be best appreciated by reference to FIG. 8, to travel down and under rollers 12 to provide room for platens 32 (not shown) during transfer of a slip sheet mounted load. Roller racks 104 and 106 may, for instance, rest on wheels 108 that travel in tracks 110. Roller racks 104 and 106 are biased by springs, pneumatic cylinders, or other appropriate devices, to return to the positions illustrated in FIGS. 7 and 8 after platens 32 have moved away from the transfer structure 90.

FOURTH EMBODIMENT

Figure 10:
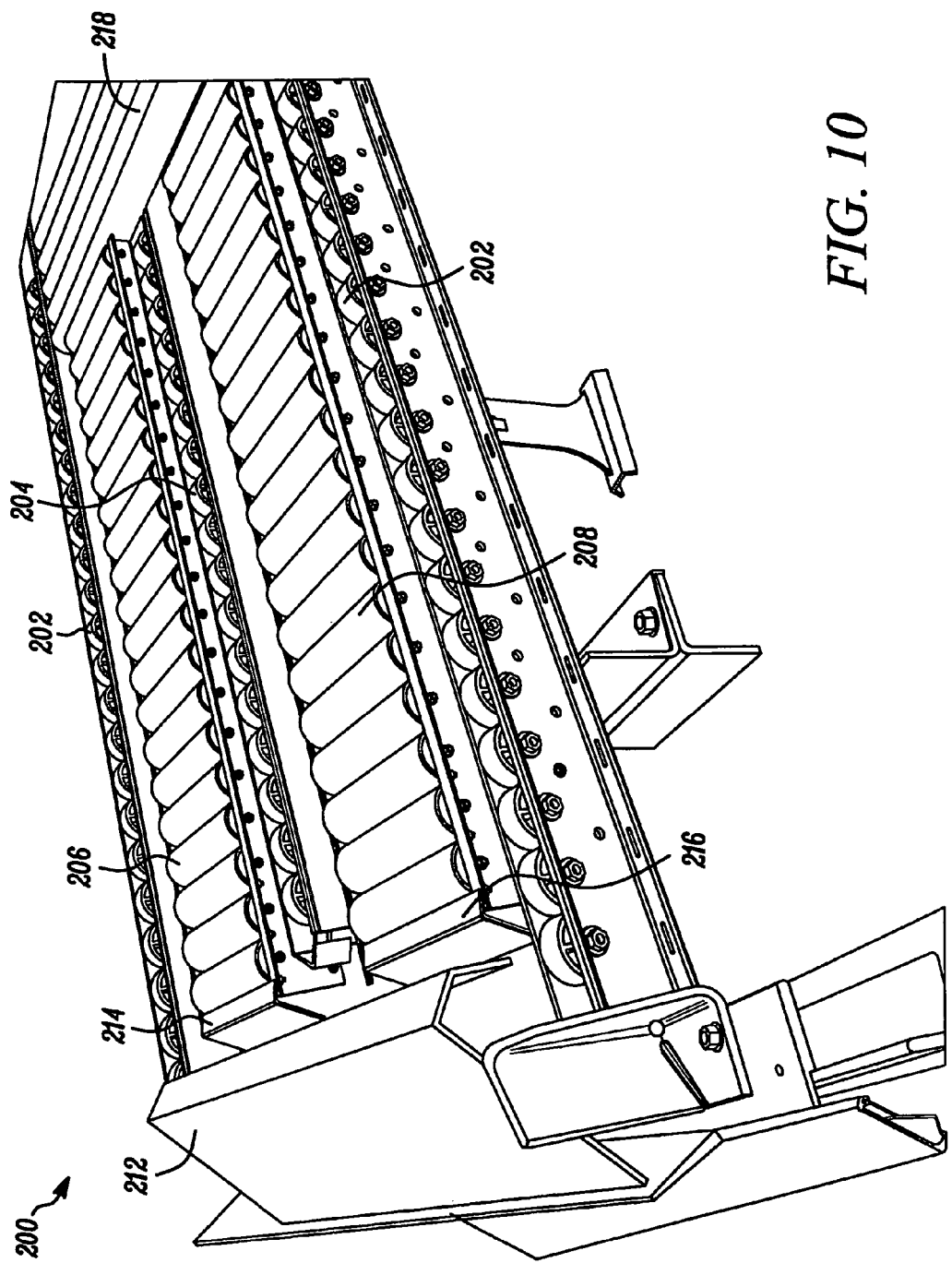
FIGS. 10-18 illustrate an associated embodiment of the transfer mechanism of this invention using racks of rollers that move down and back on tracks to make room for lift truck platens or forks.
Figure 11:
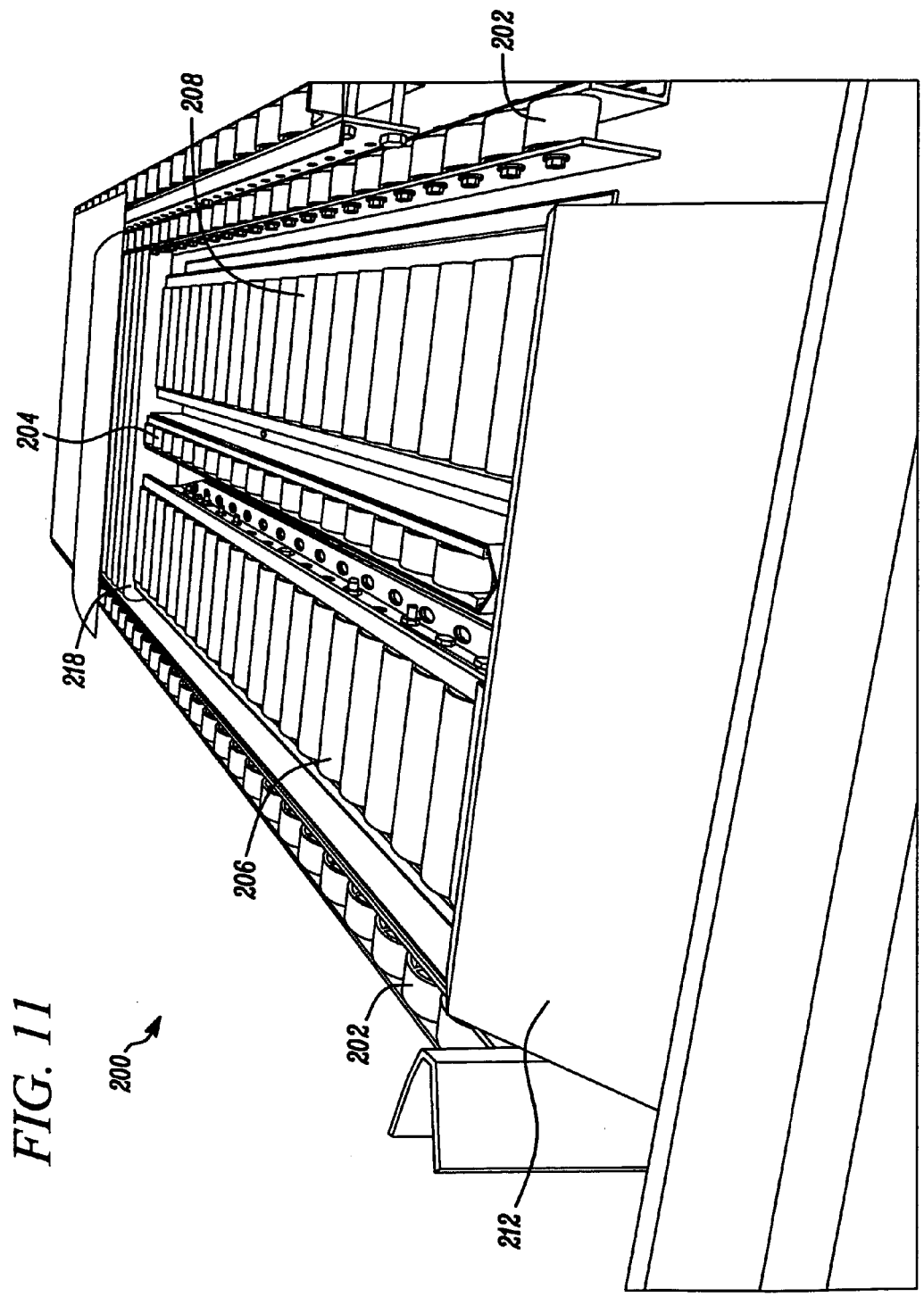

FIGS. 10, 11, 12, 13, 14, 15, 16, 17, and 18 illustrate a fourth embodiment 200 of the transfer structure of this invention. FIG. 10 illustrates a side perspective view, and FIG. 11 illustrates a front perspective view of the embodiment 200. In the embodiment 200 shown, fixed wheels 202 (structured in the same manner as fixed rollers 14 in embodiment 10 described above) are utilized. Fixed wheels 204 (similar to fixed wheels 52 in embodiment 50 described above) are located as illustrated in the center of embodiment 200, and optionally, other fixed wheels or rollers (not shown) may be used, depending on the nature of the loads to be handled and their dimensions.

Embodiment 200 also utilizes two sections of rollers 206 and 208 mounted in a manner so that they are biased by a spring, pneumatic cylinder, or other suitable structure normally to be in the position shown in FIG. 10. However, sections of rollers 206 and 208 may be caused to pivot downwards by platens (shown as 32 in FIGS. 1 and 3) so that platens 32 may lie on top of at least a portion of the sections of rollers 206 and 208.

Figure 13:
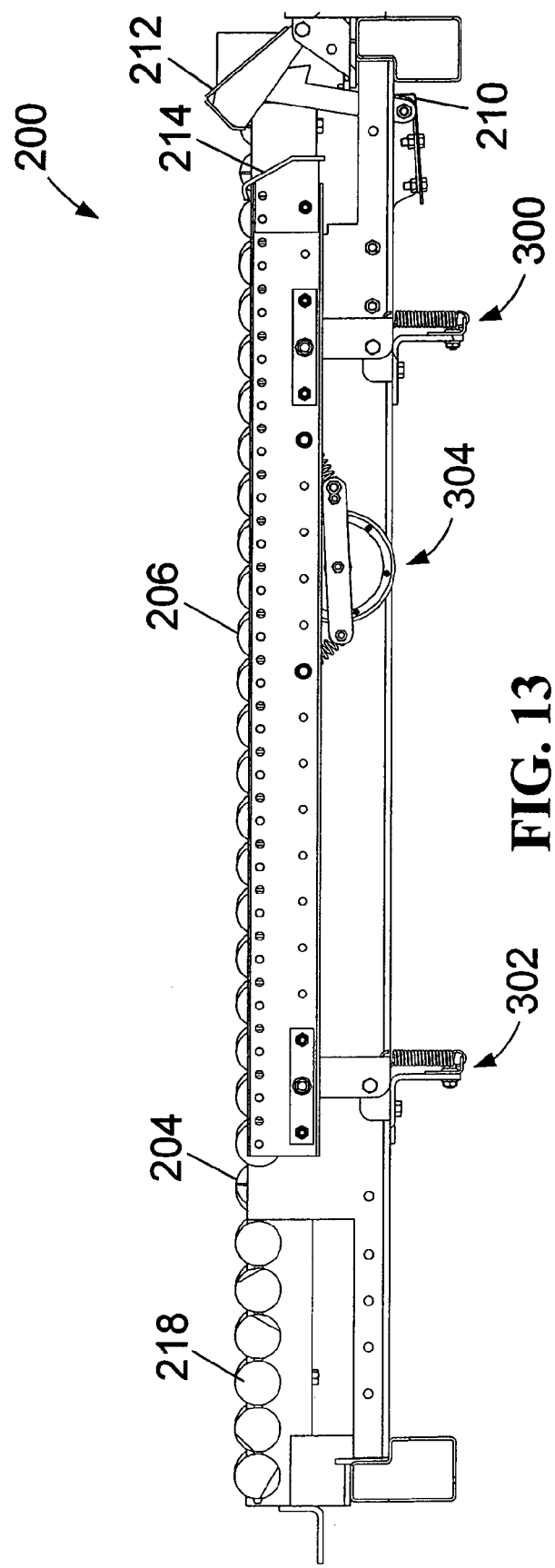

The embodiment 200 also includes an indicator, such as a safety flag shown as 210 in FIG. 13, that alerts a fork lift driver or another user of a particular condition of the embodiment 200. The safety flag is shown and described in greater detail below in FIGS. 14, 16, and 17. An indicator can include, but is not limited to, a flag, a light, a sound, a tactile-type signal, a visual-type signal, an auditory-type signal, or any other type of signal. For example, an indicator can be a light controlled by a switch activated by the structure of the stop 212.

Figure 17:
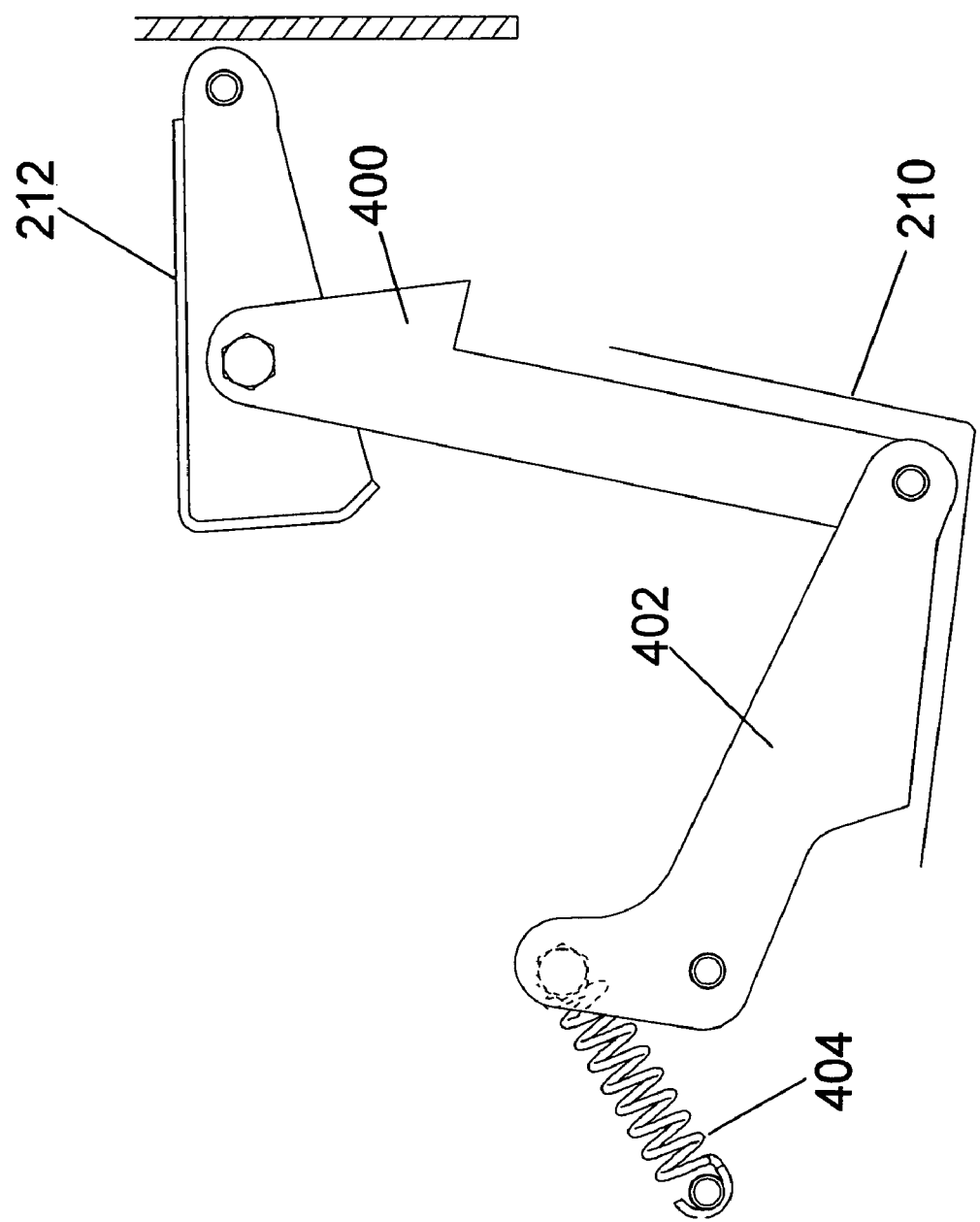

In operation of this embodiment 200, the ends of platens 32 contact stop 212 as the platens move towards the right in FIG. 10. Stop 212 is coupled to the safety flag 210 causing the safety flag 210 to pivot downward and to the left in FIG. 13 to a position to alert a fork lift driver or another user of the condition of the stop 212, i.e. in a lowered position as shown in FIG. 17. When the safety flag 210 or other indication is in a lowered position shown in FIG. 17, the safety flag 210 or other indication alerts a fork lift driver or other user to a condition where the stop 212 is sufficiently lowered to a position where a load previously adjacent to the stop 212 and already mounted on the embodiment 200 of the transfer structure could begin moving towards the ends of the platens 32. The safety flag 210 or other indication also alerts the fork lift driver or other user to begin moving the platens towards the support structures 214, 216 shown in FIG. 10 so that a slip sheet mounted load on the platens 32 can be placed on the embodiment 200 of the transfer structure and prevent a load previously adjacent to the stop 212 and already mounted on the embodiment 200 of the transfer structure from moving towards the ends of the platens 32.

As the platens move further to the right in FIG. 10, the ends of the platens contact the support structures 214 and 216 for sections of rollers 206 and 208, respectively. The contact with the platens causes the support structures 214 and 216 to pivot to the right and downward in FIG. 10 to positions out of the way of platens 32, so that a load resting on a slip sheet in turn resting on platens 32 may be placed on or moved from transfer structure 200.

Similar to the sections of rollers 54 and 56 as described above relative to the second embodiment (50) of this invention, the sections of rollers 206, 208 pivot. When the load is lifted off of transfer structure 200 or platens 32 are moved out from under the load and slip sheet, the sections of rollers 206, 208 pivot back and up to the position shown in FIG. 10, providing additional support for the slip sheet that remains on the transfer structure 200 or that is moved from a series of conveyor rollers 218 onto transfer structure 200.

Figure 12:
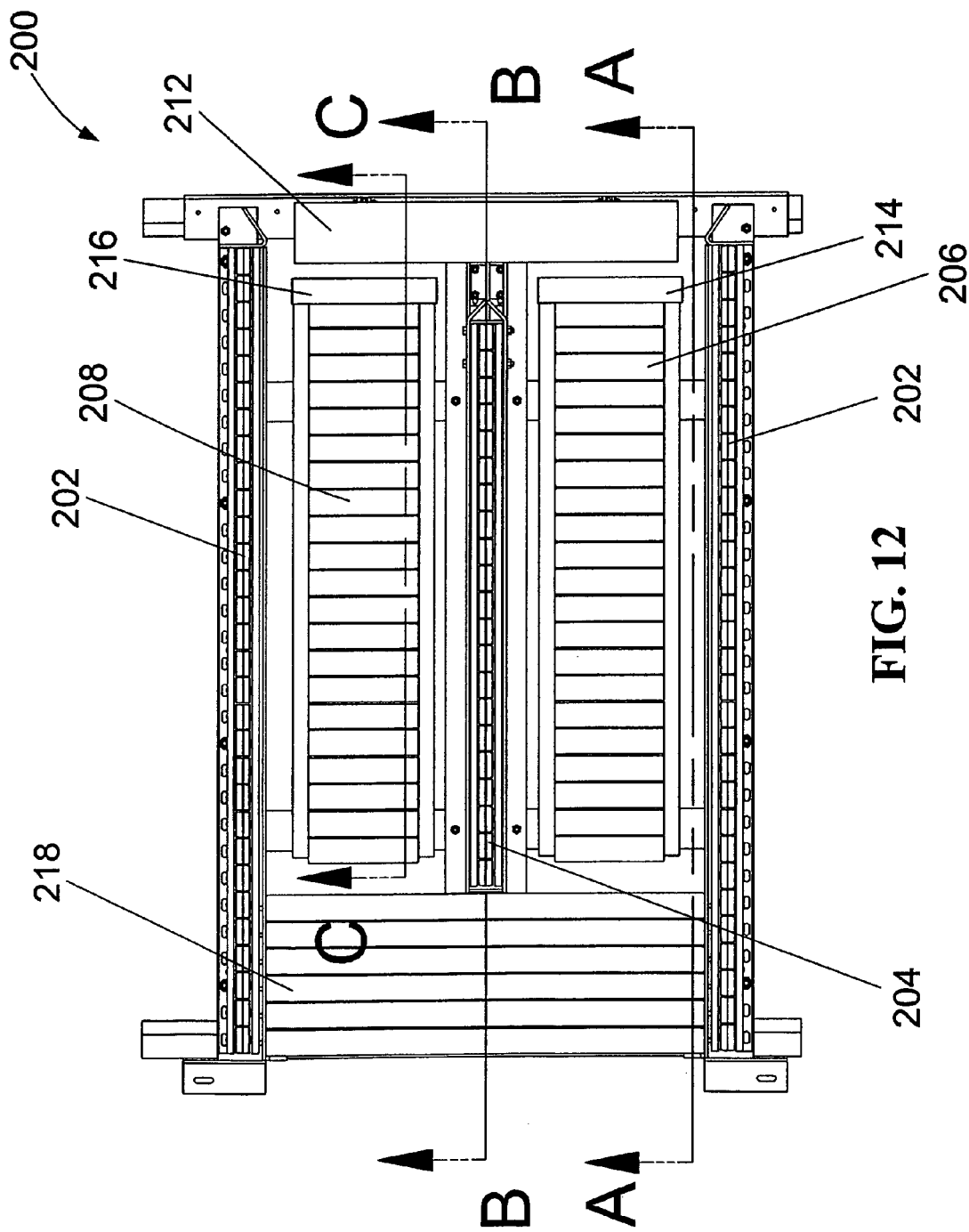

FIG. 12 illustrates an overhead or top view of the fourth embodiment of the transfer structure of this invention. FIGS. 13, 14, 15, 16, and 18 illustrate various sectional views of the fourth embodiment shown in FIG. 12.

FIG. 13 illustrates sectional view A-A through a lateral portion of the embodiment 200 shown in FIG. 12. In this view of the embodiment, the section of rollers 206, safety flag 210, stop 212, and the lateral side of support structure 214 are shown with other associated components, including a set of roller structure pivots 300 and 302, and a brake 304. The section view of FIG. 13 is taken through the safety flag 210 and stop 212 adjacent to the leading section of the transfer conveyor 200, and through the conveyor rollers 218 adjacent to the trailing section of the conveyor 200.

The stop 212 cooperates with the safety flag 210 to cause the safety flag to pivot and move downward. The stop 212 shown is a pivotable device that pivots downward when platens (shown as 32 in FIG. 1) of a fork lift contact the stop 212 and cause the safety flag 210 to pivot downward. When the platens 32 are no longer in contact with the stop 212, the stop 212 pivots upward to the position shown in FIG. 13, permitting safety flag 210 to pivot up The stop 212 is shown and described in greater detail below in FIGS. 14, 16, and 17.

The roller structure pivots 300, 302 pivot the section of rollers 206 downward when platens 32 of a fork lift contact a front portion of the section of rollers 206. When the platens 32 are no longer in contact with any portion of the section of rollers 206, the support structure 214 pivots upwards to the position shown in FIG. 13. Corresponding roller structure pivots for the other section of rollers 208 operate similarly to the roller structure pivots 300, 302 shown here. Roller structure pivots are shown and described in greater detail below in FIGS. 15 and 18.

Figure 15:
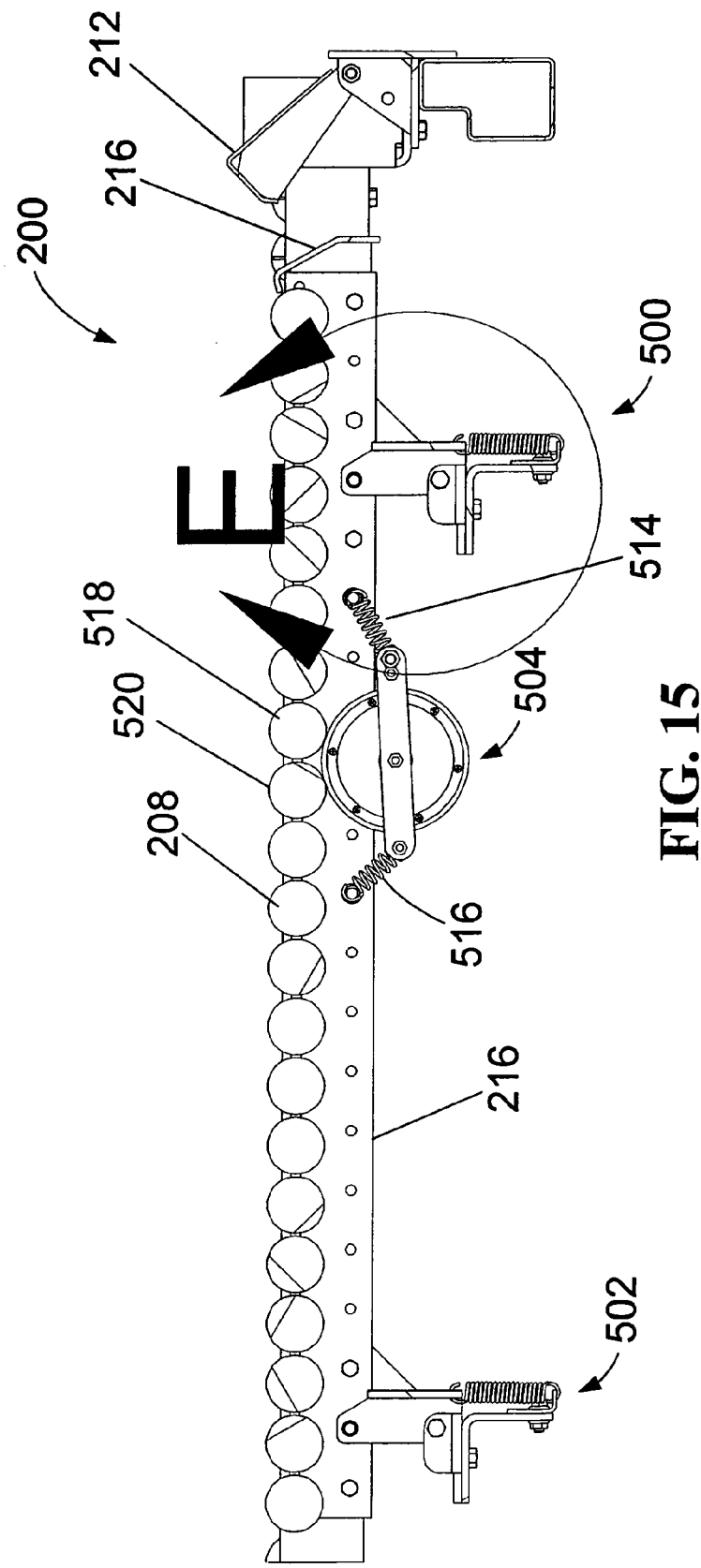

The brake 304 provides braking action for a load moving along a section of rollers 206 towards the stop 300. When the rotation of at least one roller of the section of rollers 206 exceeds a preset amount determined by the rating of the brake 304, the brake 304 automatically slows the rotation of at least the particular roller. The brake 304 can be a conventional centrifugal mechanical brake for gravity flow systems. A brake is shown in FIG. 15 and described in greater detail below.

Figure 14:
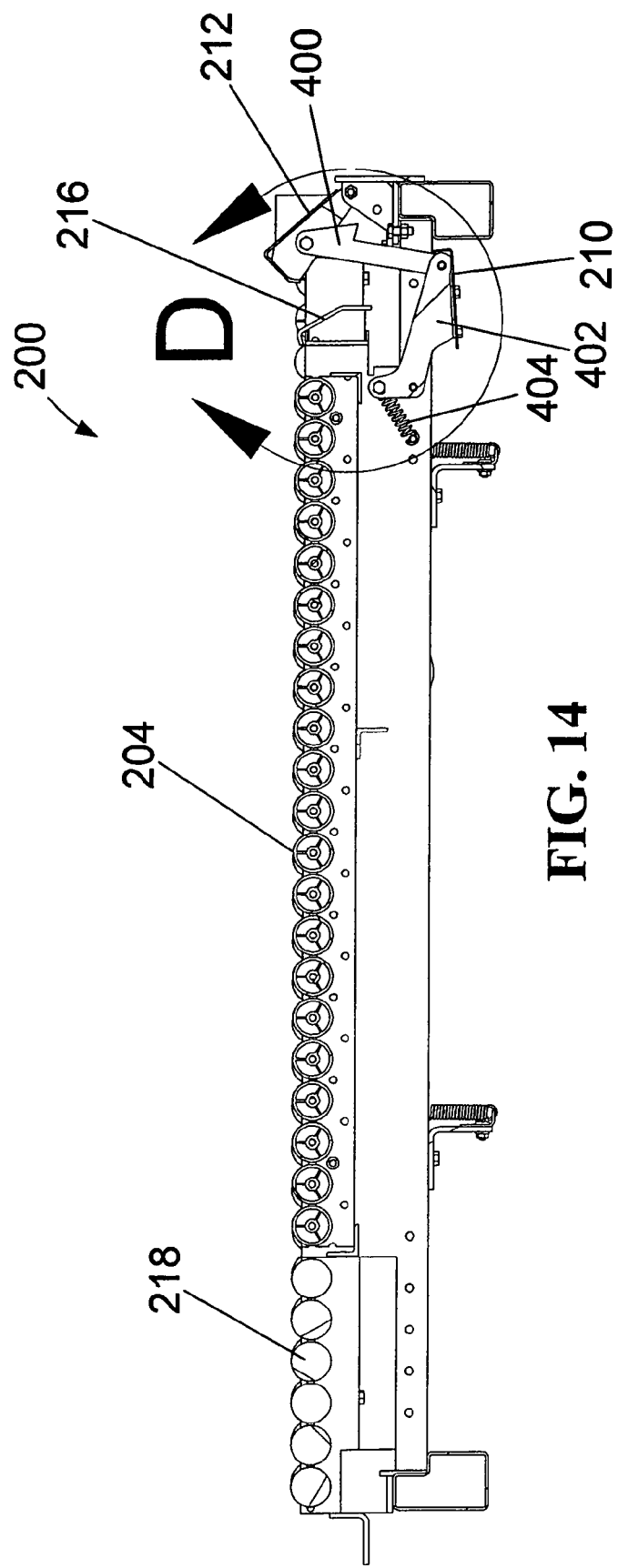
Figure 16:
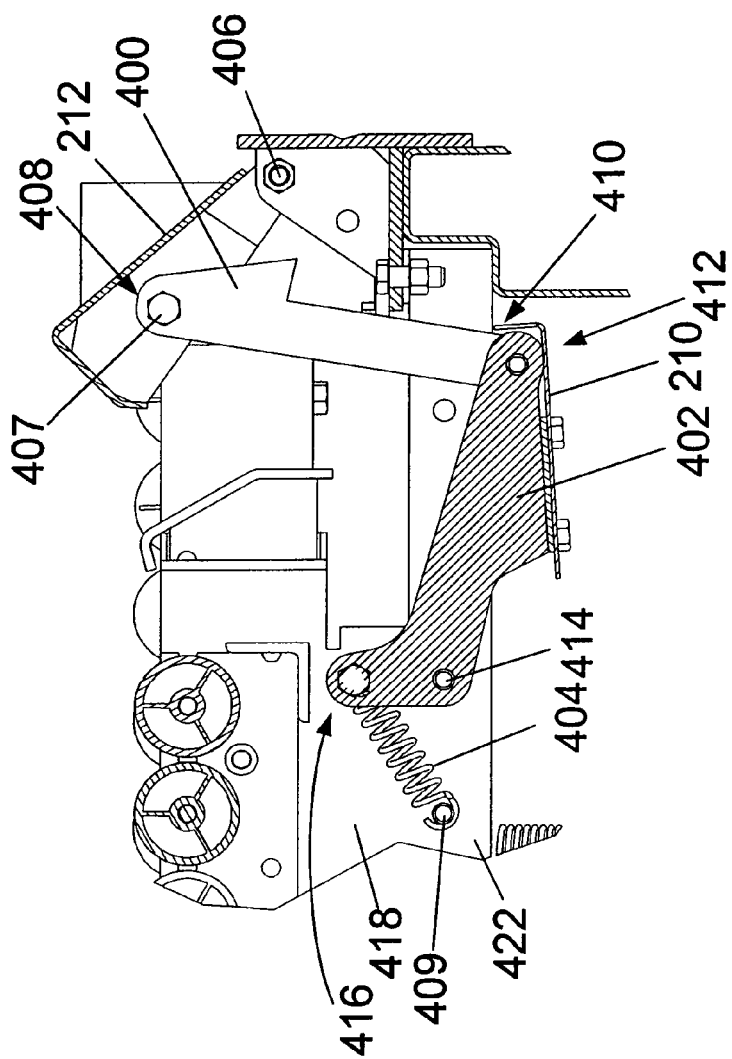

FIG. 14 is a sectional view taken through line "B-B" in FIG. 12; FIG. 16 is an enlarged view of the portion within circle "D" in FIG. 14 showing safety flag 210 and stop 212; and FIG. 17 is a view of the safety flag 210 and stop 212 in a lowered position. In these views of the embodiment 200, the stop 212 is shown connected to a series of linkages that connect to the safety flag 210. The series of linkages include a stop arm 400, a pivot arm 402, and a spring 404. The section view shown cuts through the central portion of the stop 212, the roller wheels 204 in the central portion of the embodiment 200, and the central portion of the conveyor rollers 218.

As shown in FIGS. 16 and 17, the stop 212 rotates about a stop pivot bolt 406. Stop 212 is connected by bolt 407 to an upper end 408 of the stop arm 400. The lower end 410 of the stop arm 400 is coupled to the right end 412 (in FIG. 16) of the pivot arm 402. The pivot arm 402 rotates about pivot 414 just below the spring end 416 of the pivot arm. An expansion spring 404 is connected between spring end 416 of the pivot arm 402 and a pin 409 fixed to support structure 418 to bias end 412 upward and, this, stop 212 upright.

In FIG. 16, the safety flag 210 and stop 212 are shown in an upper or initial position. When a force is applied against the stop 212 in this position, for example, a lateral and/or downward force from a platen (shown as 32 in FIG. 1), the stop 212 rotates about the stop pivot mount 406, urging stop arm 400 downward causing pivot arm 402 to rotate clockwise. The spring 404 to reacts to the force with an opposing force adjacent to the opposing end 418 of the pivot arm 402 as the pivot arm 402 rotates in response to the portion of the force from the stop arm 400. The opposing force from the spring 404 increases until the stop 212 has reached a lower or horizontal position, in this example, caused by a platen 32 resting on a portion of the stop 212. In this position, as may be seen in FIG. 17, a portion of the safety flag 210 is visible to a user, such as a fork lift driver, positioned at the leading end of the transfer structure 200. In this manner, the safety flag 210 alerts the user that the stop 212 is at or near a lower or horizontal position, indicating that a slip sheet mounted load can be safely placed on the transfer structure 200, or alternatively a slip sheet mounted load can be safely removed from the transfer structure 200.

When the lateral and/or downward force from the platen 32 is removed from the stop 212, the spring 404 causes the pivot arm 402 to rotate in a counterclockwise direction about the pivot arm mount 414 in the example shown. The rotation of the pivot arm 402 in the counterclockwise direction moves the stop arm 400 upward and causes the stop 212 to rotate about the stop pivot mount 406 until the stop 212 reaches the upper or initial position, shown in FIG. 16. In this position, the safety flag 210 should not be visible to a user, such as a fork lift driver, positioned at the leading end of the transfer structure 200 alerting the driver that the stop 212 can block the movement of a slip sheet mounted load moving towards the leading end of the transfer structure 200.

Figure 18:
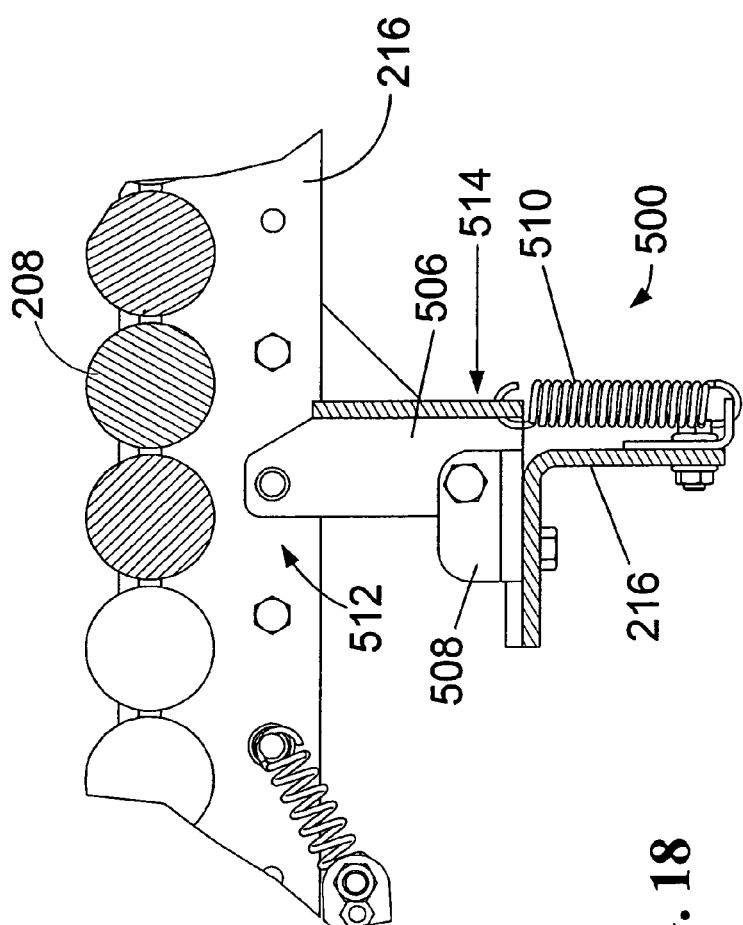

FIG. 15 is a sectional view through line "C-C" in FIG. 12, and FIG. 18 is an enlarged view of the roller structure pivot 500 in circle "E" in FIG. 15. In these views, the roller structure pivots 500, 502 mount to a section of rollers 208, and the brake 504 mounts to the support structure 216 beneath a portion of the section of rollers 208. Separate roller structure pivots 300, 302 and a separate brake 304 mount to the other section of rollers 206 shown in FIG. 13. The roller structure pivots 500, 502 shown each include a pivot arm 506, a pivot mount 508, and a return spring 510.

As shown in FIG. 18, the section of rollers 208 is attached to the upper end 512 of the pivot arm 506 such that the section of rollers 208 can move to the left (as shown in FIG. 18) and down as pivot arm 506 moves from the vertical position shown toward a horizontal position. Return spring 510 connects between a lower portion of the support structure 216 and the pivot arm 506 to urge rollers 208 toward the position shown in FIG. 18 with the rollers 208 co-planar with the fixed rollers 218.

In FIGS. 15 and 18, the pivot arm 506 and section of rollers 208 are shown in an upper or initial position. When a force is applied against a portion of the section of rollers 208 in this position, for example, a lateral and/or downward force from a platen (shown as 32 in FIG. 1), the section of rollers 208 rotates about the pivot arm 506, and the pivot arm 506 rotates with respect to the pivot mount 508 so that a portion of the lateral and/or downward force is transferred from the section of rollers 208 to the pivot arm 506. The pivot arm 506 moves downward and transfers a portion of the force to the pivot mount 508. The pivot mount 508 receives the portion of the force as the pivot arm 506 rotates about the pivot mount 508 in a counterclockwise direction in the example shown. As the pivot arm 506 rotates, the return spring 510 reacts to the force with an opposing force adjacent to the opposing end 514 of the pivot arm 504. The opposing force from the return spring 510 increases until the section of rollers 208 has reached a lower position, in this example, caused by a platen 32 resting on a portion of the section of rollers 208. In this position, a slip sheet mounted load can be placed on the section of rollers 208, or alternatively a slip sheet mounted load can be removed from the section of rollers 208.

While the section of rollers 208 is in a lower position, the return spring 510 maintains the opposing force on the opposing end 514 of the pivot arm 506. When the lateral and/or downward force from the platen 32 is removed from the section of rollers 208, the return spring 510 causes the pivot arm 506 to rotate in a clockwise direction with respect to the pivot mount 508 in the example shown. The rotation of the pivot arm 506 in the clockwise direction moves causes the section of rollers 208 to pivot upwards and to the right in the example shown until the section of rollers 208 reaches the upper or initial position, shown in FIGS. 15 and 18. In this position, the safety flag 210 should not be visible to a user, such as a fork lift driver, positioned at the leading end of the transfer structure 200. In this position, a slip sheet mounted load can be supported by the section of rollers 208, or alternatively the section of rollers 208 is not supporting any load.

The brake 504 is shown in FIG. 15, and is shown mounted adjacent to a portion of the section of rollers 208. Mounting springs 514, 516 connected to the support structure 216 support the brake 504 beneath the section of rollers such that a portion of the section of rollers 208 is in contact with the brake 504. In the example shown, two rollers 518, 520 are in contact with the brake 504.

In operation, the brake 504 contacts a portion of the section of rollers 208, rollers 518 and 520 in the example shown, and rotates when the portion of the section of rollers 208 rotates. When the rotational speed of rollers 208 exceeds a preset amount determined by the rating of the brake 504, the brake 504 automatically slows the rotation of the portion of the section of rollers. The brake 504 can be a conventional centrifugal mechanical brake for gravity flow systems of the type distributed by Creative Storage Systems.

As will be appreciated by reference to the Figures and description of this invention above, the transfer structure 200 can be practiced in several alternative configurations including configurations not shown in the drawings.

In general, all such configurations can provide a transfer mechanism with multiple rollers for supporting a load mounted on a slip sheet so that the load can advance on rollers in the transfer mechanism to a conventional roller conveyor structure or can advance from a conventional roller conveyor structure to the rollers of the transfer mechanism. Some of the rollers or wheels of the transfer mechanism remain fixed in a plane that is substantially the same plane as the tops of adjacent rollers of the conventional roller conveyor. Other rollers, wheels, or other support structures are positioned and mounted to move from: (1) a first position where their support surfaces are in the same plane with the support surfaces of the fixed rollers, wheels or other support structures to (2) a second position permitting the platens of a lift truck to be positioned with their support surfaces in the same plane as the support surfaces of the fixed wheels or rollers. Other load bearing surfaces substitutable for rollers and wheels can be used in appropriate circumstances, including, for instance, low friction surfaces and conveyor belts among other alternatives.

Various methods in accordance with embodiments of the present invention may be carried out. For example in one embodiment, a method of using a transfer conveyor structure includes lifting a slip sheet mounted load with a lift platen; contacting a stop associated with the transfer conveyor structure with a portion of the platen, wherein the stop pivots to a lower position; receiving an indication of the lower position of the stop; contacting the platen with a portion of the movable position rollers associated with the transfer conveyor structure, wherein the movable position rollers pivot downward; lowering the slip sheet mounted load onto a portion of the fixed position rollers; and removing the platen from contact with the slip sheet mounted load, wherein a portion of the movable position rollers pivot upward to contact a portion of the slip sheet mounted load, and the stop pivots to an upper position.

Figure 19:
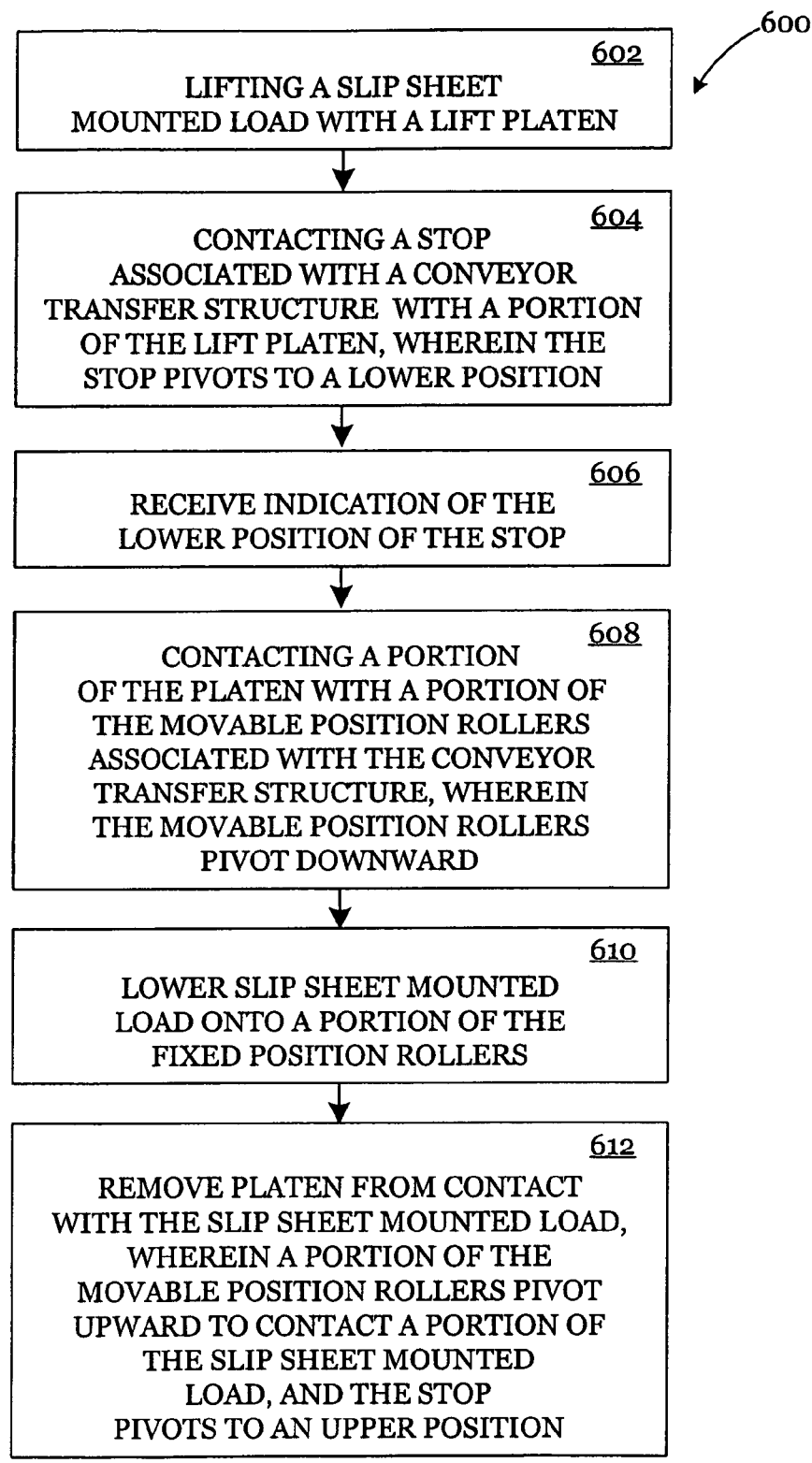
FIGS. 19-20 illustrate the methods of this invention using transfer conveyor structures and associated apparatus.

FIG. 19 illustrates an exemplary method 600 of using a conveyor transfer structure. This exemplary method is provided by way of example, as there are a variety of ways to carry out methods according to the present invention. The method 600 shown in FIG. 19 can be executed in conjunction with or otherwise performed with some or all conveyor transfer structures. The method 600 is described below as carried out by the transfer structure 200 shown in FIGS. 10-18 by way of example, and various elements of the transfer structure 200 are referenced in explaining the example method of FIG. 19.

In block 602, the method 600 begins with lifting a slip sheet mounted load with a lift platen. In the embodiment shown, the platens (shown as 32 in FIG. 1) of a fork lift are used to lift a slip sheet mounted load above a firm surface.

Block 602 is followed by block 604, in which a stop associated with the transfer conveyor structure contacts a portion of the platen, wherein the stop pivots to a lower position. In the embodiment shown, stop 212 pivots downward when a portion of the platen 32 contacts the stop 212. The stop 212 pivots between the upper position shown in FIG. 16 and the lower position shown in FIG. 17.

Block 604 is followed by block 606, in which an indication of the lower position of the stop is received. In the embodiment shown, the stop 212 is operably connected with an indicator such as the safety flag 210 shown in FIG. 17. When the stop 212 pivots to the lower position, the safety flag 210 provides an indication that the stop is in a lower position. The indication from the safety flag 210 can be viewed from a leading edge of the conveyor transfer structure 200. In other embodiments of the invention, an indicator can be any of the example indicators described above, such as a light or a sound.

Block 606 is followed by block 608, in which the platen contacts a portion of the movable position rollers associated with the transfer conveyor structure, wherein the movable position rollers pivot downward. In the example shown, the platen 32 moves forward into contact with a portion of the movable position rollers 206 or 208, such as the respective support structure 214, 216. The movable position rollers 206 or 208 pivot downward in response to contact with the platen 32.

Block 608 is followed by block 610, in which the slip sheet mounted load is lowered onto a portion of the fixed position rollers. In the example shown, the platen 32 is positioned over a portion of the movable position rollers 206 or 208. As the platen 32 is lowered over the portion of the movable position rollers 206 or 208, the movable position rollers 206 or 208 pivot downward, and the slip sheet mounted load on the platen 32 contacts a portion of the fixed rollers 202, 204.

Block 610 is followed by block 612, in which the platen is removed from contact with the slip sheet mounted load, wherein a portion of the movable position rollers pivot upward to contact a portion of the slip sheet mounted load, and the stop pivots to an upper position. In the embodiment shown, when the platen 32 is sufficiently lowered and the slip sheet mounted load is in contact with a portion of the fixed position rollers 202, 204, the platen 32 can be removed from beneath the slip sheet mounted load. As the platen 32 is removed and is no longer in contact with the portion of movable position rollers 206 or 208, such as the support structure 214, 216, the movable position rollers 206 or 208 pivot upward to contact a portion of the slip sheet mounted load. Removing the platen 32 causes an indicator such as the safety flag 210 to discontinue indicating the lower position of the stop as shown in FIG. 16.

Figure 20:
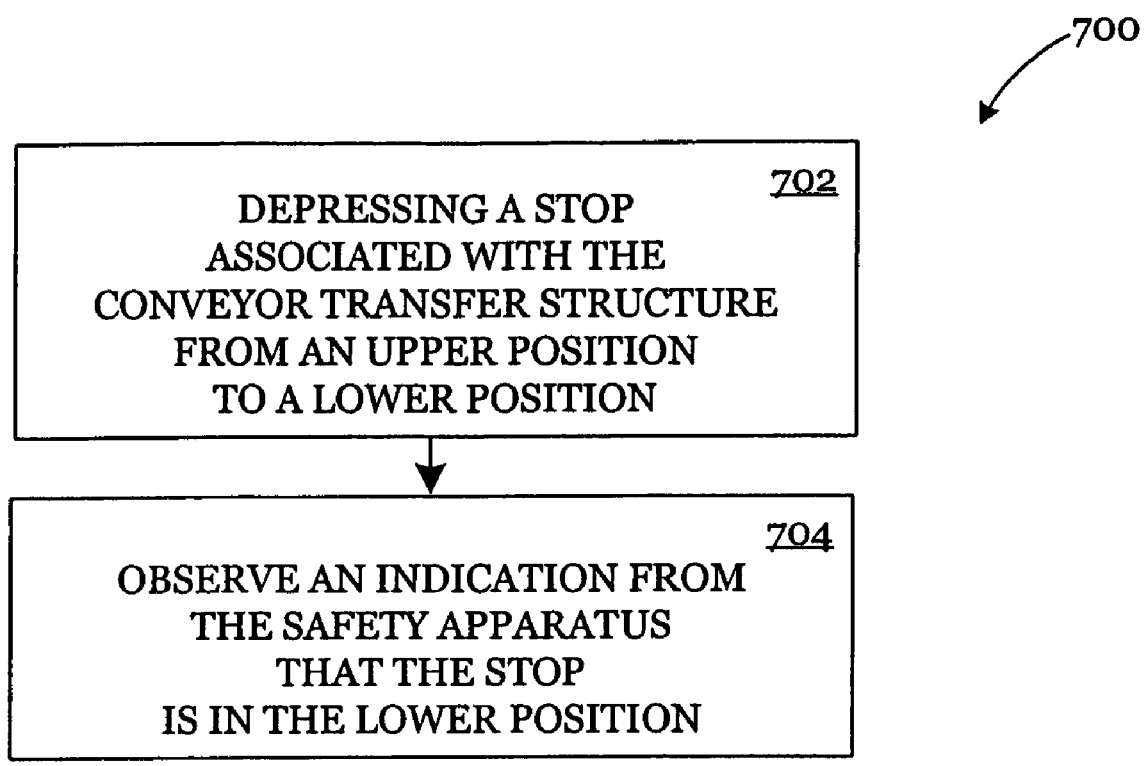

Another method 700 in accordance with an embodiment of the invention includes a method of using a safety apparatus with a conveyor transfer structure. The method 700 shown in FIG. 20 can be executed in conjunction with or otherwise performed with some or all conveyor transfer structures. The method 700 is described below as carried out by the transfer structure 200 shown in FIGS. 10-18 by way of example, and various elements of the transfer structure 200 are referenced in explaining the example method of FIG. 20.

In block 702, the method begins with depressing a stop associated with the conveyor transfer structure from an upper position to a lower position. In the embodiment shown, the indication is an indicator such as a safety flag 210 operably connected to the stop 212. Stop 212 pivots downward when a portion of the platen 32 (as shown in FIG. 1) contacts the stop 212. The stop 212 pivots between the upper position shown in FIG. 16 and the lower position shown in FIG. 17. In other embodiments of the invention, an indicator can be any of the example indicators described above, such as a light or a sound.

Block 702 is followed by block 704, in which an indication from the safety apparatus is observed that the stop is in the lower position. In the embodiment shown, when the stop 212 pivots to the lower position, the indicator such as the safety flag 210 provides an indication that the stop is in a lower position. The indication from the safety flag 210 can be viewed from a leading edge of the conveyor transfer structure 200.

While the above description contains many specifics, these specifics should not be construed as limitations on the scope of the invention, but merely as exemplifications of the disclosed embodiments. Those skilled in the art will envision many other possible variations that are within the scope of the invention.

The invention we claim is:

1. A conveyor transfer structure for use with loads supported on a slip sheet, the conveyor structure comprising: (a) fixed position rollers for contact with the slip sheet; (b) movable position rollers movable between a first position supporting at least a portion of the slip sheet and a second position permitting lift platen contact with at least a portion of the slip sheet; and (c) a stop movable between an elevated position and a depressed position when a lift platen contacts the stop, wherein the elevated position permits lift platen contact with the stop and the depressed position permits lift platen contact with at least a portion of the movable position rollers.

2. The conveyor structure of claim 1, further comprising: (d) an indicator operably connected to the stop, wherein the indicator indicates a position of the stop.

3. The conveyor transfer structure of claim 2, wherein the indicator indicates the depressed condition of the stop.

4. The conveyor transfer structure of claim 2, wherein the indicator is positioned to be observed by a user of the lift platen when the stop is in at least the depressed position.

5. The conveyor structure of claim 2, wherein the indicator comprises at least one of the following: a flag, a light, a sound, a tactile-type signal, a visual-type signal, and an auditory-type signal.

6. The conveyor transfer structure of claim 1, further comprising: (d) a brake operably connected to a portion of the fixed position rollers, wherein the brake is adapted to decrease rotation of the fixed position rollers at a predetermined brake rating.

7. A safety apparatus for use with a conveyor transfer structure comprising movable position rollers, the apparatus comprising: (a) a stop movable between an upper position and a lower position when a lift platen contacts the stop via movement towards the conveyor transfer structure, wherein the lower position permits lift platen contact with the movable position rollers; and (b) an indicator operably connected to the stop providing an indication of a position of the stop.

8. The apparatus of claim 7, wherein the stop is adapted for contact with the lift platen, wherein contact between the stop and lift platen causes the stop to move between the upper position and the lower position.

9. The apparatus of claim 7, wherein the indicator indicates the position of the stop.

10. The apparatus of claim 7, wherein the indicator indicates the lower position of the stop.

11. The apparatus of claim 7, wherein the indicator is positioned to be observed by a user of the lift platen when the stop is in at least the lower position.

12. The apparatus of claim 7, wherein the indicator comprises at least one of the following: a flag, a light, a sound, a tactile-type signal, a visual-type signal, and an auditory-type signal.

13. A method of using a transfer conveyor structure, comprising: (a) lifting a slip sheet mounted load with a lift platen; (b) contacting a stop associated with the transfer conveyor structure with at least a portion of the lift platen, wherein the stop pivots to a lower position; (c) receiving an indication of the lower position of the stop; (d) contacting the lift platen with at least a portion of movable position rollers associated with the transfer conveyor structure, wherein the movable position rollers pivot downward; (e) lowering the slip sheet mounted load onto at least a portion of fixed position rollers; and (f) removing the lift platen from contact with the slip sheet mounted load, wherein at least a portion of the movable position rollers pivot upward to contact at least a portion of the slip sheet mounted load, and the stop pivots to an upper position.

14. The method of claim 13, wherein (c) receiving an indication of the lower position of the stop comprises observing an indicator operably connected to the stop, wherein the indicator indicates the lower position of the stop.

15. The method of claim 14, wherein the indicator comprises at least one of the following: a flag, a light, a sound, a tactile-type signal, a visual-type signal, and an auditory-type signal.

16. The method of claim 14, wherein (f) removing the lift platen comprises causing the indicator to discontinue indicating the lower position of the stop.

17. A method of using a safety apparatus with a conveyor transfer structure for supporting a slip sheet mounted load, the method comprising: (a) depressing a stop from an upper position to a lower position by a lift platen moving towards the conveyor transfer structure wherein the stop is associated with the conveyor transfer structure; and (b) observing an indication from the safety apparatus that the stop is in the lower position.

18. The method of claim 17, wherein the indication is a flag operably connected to the stop.

19. The method of claim 17, wherein the indication comprises at least one of the following: a flag, a light, a sound, a tactile-type signal, a visual-type signal, and an auditory-type signal.

20. The method of claim 17, further comprising: (c) removing contact between the lift platen and stop, whereby the indication discontinues indicating the lower position of the stop.

* * * * *